United States Patent
Ronen et al.

(10) Patent No.: US 7,711,850 B2
(45) Date of Patent: *May 4, 2010

(54) ELECTRONIC MARKETPLACE USED TO LEASE DOMAIN NAMES AND REDIRECT WEB SURFERS FROM LEASED DOMAIN NAMES

(75) Inventors: Ofer Ronen, West Windsor, NJ (US); Ross D. Weldon, Sunnyvale, CA (US)

(73) Assignee: Sendori, Inc., Oakland, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 11/532,833

(22) Filed: Sep. 18, 2006

(65) Prior Publication Data

US 2007/0260518 A1 Nov. 8, 2007

Related U.S. Application Data

(60) Provisional application No. 60/717,306, filed on Sep. 16, 2005, provisional application No. 60/738,382, filed on Nov. 21, 2005.

(51) Int. Cl.
*G06F 15/173* (2006.01)
(52) U.S. Cl. ........................................ 709/239; 705/37
(58) Field of Classification Search ................. 709/200, 709/238–244; 705/37
See application file for complete search history.

(56) References Cited

U.S. PATENT DOCUMENTS

| | | | |
|---|---|---|---|
| 5,724,521 A | 3/1998 | Dedrick | |
| 5,855,008 A | 12/1998 | Goldhaber et al. | |
| 6,202,051 B1* | 3/2001 | Woolston | 705/27 |
| 6,269,361 B1 | 12/2001 | Davis et al. | |
| 6,826,572 B2 | 11/2004 | Colace et al. | 707/10 |
| 7,188,138 B1* | 3/2007 | Schneider | 709/203 |
| 7,281,042 B2 | 10/2007 | Hsu et al. | |
| 2001/0034657 A1 | 12/2001 | Shuster | |
| 2002/0019800 A1 | 2/2002 | Shuster | 705/37 |
| 2002/0103740 A1 | 8/2002 | Maroney | 705/37 |
| 2004/0058460 A1 | 4/2004 | Feeley et al. | |
| 2005/0021588 A1* | 1/2005 | Zimmerman et al. | 709/200 |
| 2005/0027882 A1* | 2/2005 | Sullivan et al. | 709/244 |
| 2005/0105513 A1* | 5/2005 | Sullivan et al. | 370/352 |
| 2006/0069784 A2 | 12/2006 | Hsu | |

OTHER PUBLICATIONS

OOGLE, OOGLE.COM Currently for Rent/Lease for Advertising, Sep. 7, 2005, http://www.webhostingtalk.com/archive/index.php/t-441504.html.*

Google, Google Adwords Learning Center, Jun. 25, 2005, http://www.google.com/adwords/learningcenter/text/.*

(Continued)

*Primary Examiner*—John Follansbee
*Assistant Examiner*—James E Conaway
(74) *Attorney, Agent, or Firm*—Stephen M. De Klerk; Sonnenschein, Nath & Rosenthal LLP

(57) ABSTRACT

An electronic marketplace allows owners of unused Internet domain names to lease the domain names using a bidding process. The system allows owners to monetize domain names and lessees to obtain customers who are redirected from targeted domain names.

11 Claims, 12 Drawing Sheets

OTHER PUBLICATIONS

Advertising.com, VisitorBid.com website, Mar. 2004.*
International Search Report Issued Aug. 4, 2008 for PCT/US08/57070.
Angwin, "For These Sites, Their Best Assets is a Good Name," Wall Street Journal, p. B1, (May 1, 2006).
Jackson, "Why Parking Companies Want Your Portfolio and What DomainSponsor.com is Doing to Try to Get it," Domain Name Journal, (Oct. 2004).
Swartz, "Domain names Become Premium Web Real Estate," USA Today, (May 9, 2006).
Walker, "The Web's Million Dollar Typos," The Washington Post, p. F01, (Apr. 30, 2006).
"Generating Income from Domain Names" http://www.NameNewbie.com/Domain_income.html.
"10,000 Real Traffic Visitors Viewing Your Web Site" at http://cgi.ebay.com/10-000-Real-Traffic-Visitors-Viewing . . . .
VISITORBID.COM, "FAQ", http://www.bidvisitor.com/faq.html, pp. 1-5, Advertising.com, 2002.
International Search Report Issued Mar. 17, 2008 for PCT/US06/36383.

* cited by examiner

ELECTRONIC MARKETPLACE USED TO LEASE DOMAIN NAMES AND REDIRECT WEB SURFERS FROM LEASED DOMAIN NAMES

CROSS-RELATED APPLICATIONS

This application claims priority to U.S. Provisional Patent Application Ser. No. 60/717,306 filed Sep. 16, 2005, and U.S. Provisional Patent Application Ser. No. 60/738,382 filed Nov. 21, 2005.

BACKGROUND OF THE INVENTION

1. Field of the Invention

This invention relates to monetization of unused Internet domain names and online advertising.

2. Description of the Prior Art

Internet domain monetization allows domain name owners to earn revenue from domain names that are unused, e.g. have only place-holder web sites. Currently monetization is accomplished by placing sponsored links on unused domains, also referred to as "parking" a domain. For example the owner of cellphones.com might place sponsored links to destination sites such as verizon.com, att.com, and nextel.com. The domain owner is then paid for every click on a sponsored link, or for every click on a sponsored link that results in the conversion of the end user into a customer on the destination site.

Sponsored links are provided by advertising networks such as Google AdWords, Yahoo! Search Marketing, and LinkShare. These advertising networks have agreements with advertisers such as Verizon, AT&T, and Nextel. Alternatively, sponsored links are provided by an intermediary, who specializes in optimizing the revenue produced by unused domains. Intermediaries provide sponsored links from one or many advertising networks. There are a number of intermediaries that provide this type of service including DomainSponsor, Parking.com, and Sedo.com.

The main limitation of monetizing unused domains with sponsored links is that it is contingent on end users clicking on links. In many cases only few end users click on the sponsored links and so the domain owner does not monetize the bulk of the Web traffic to their website. For example, in the case of cellphones.com, if 1,000,000 users visit the site every day and only 5% of the users click on sponsored links, then 950,000 of the daily users are not monetized.

Another limitation of monetizing unused domains using sponsored links is that advertisers have their sponsored links placed next to competing services and have to vie for the attention, and clicks, of end users.

A different type of advertising network is provided by TrafficRouter.com. TrafficRouter sells electronic real-estate on websites. Customers can purchase banner advertising space or text advertising links on various websites that register with TrafficRouter. Customers bid to gain the right to have their banner shown on another website or to have a link on another website point to their destination site. The TrafficRouter model also suffers from the limitation that website owners, or domain owners, are only paid when end users click on banners or links. Furthermore, it does not allow advertisers to fully own the user experience.

U.S. Patent Application 20010034657 shows a system that allows domain owners to sublicense sub-domains, also known as third-level domains. For example, the owner of house.com could sublicense chicago.house.com or philadelphia.house.com. This model has two significant limitations. First, it is much more likely that individuals surfing the web would type-in a second-level domain such as house.com compared to a third-level domain such as chicago.house.com. Thus, a service that offers access to second-level domains is much more attractive to advertisers. Second, since sub-domains are simply licensed for a fixed fee, there is no mechanism for identifying a fair price for domains.

On eBay, users sell blocks of traffic. For example, a user might create an auction for 10,000 users who will be sent to the winner's website. The winner of the auction receives traffic from various sources, including redirects from unused domains. A problem with this model is that the advertiser does not get to pick the specific domains that will send it traffic. Another problem is that advertisers are bidding for fixed blocks of traffic, so they have to keep buying blocks in separate lots in order to have a continuous level of redirected traffic.

BRIEF SUMMARY OF THE INVENTION

The present invention creates an electronic marketplace where owners of Internet domain names can have multiple parties compete for the right to lease their domain names. A marketplace provider supplies a technology for redirecting Internet traffic from leased domain names to domain names specified by parties that win the right to lease domain names.

This invention addresses the limitations of the prior art by redirecting users who visit an unused domain directly to one or more advertisers. The advertiser pays a predetermined bid amount per redirected end user. For example, every end user who visits cellphones.com might be redirected to the Verizon website. Thus, the redirect model can result in 100% of end users visiting an unused domain being monetized, instead of only end users who click on sponsored links. Moreover, with the redirect model advertisers never compete for the attention, and clicks, of end users. The prices for leased domains are set by a marketplace that can weight a number of variables in lease transactions, including monetary bids, time of day/week/year, total revenue received from a lessee, geographic location, customer conversion rate, etc.

The current invention also has the advantage of providing the end user a user experience fully owned by the advertiser: the user never need see an originating website and never has to find and click on a link or banner. Rather, the user is seamlessly redirected to the advertiser site.

As an example, the owner of espn.com and the owner of sportillustrated.com might compete to lease traffic from tennistoday.com. Each party would submit a bid amount that it is willing to pay for each visitor redirected from tennistoday.com to its website. If the owner of espn.com submits a higher bid than the owner of sportsillustrated.com, then the owner of espn.com would win the right to lease traffic from tennistoday.com. Individuals that type tennistoday.com into their Web browsers would then be redirected using the marketplace technology to espn.com. Biddings can be conducted periodically. For example, there might be only one day a month that potential lessees could bid for domain names.

Each redirect of Internet traffic costs the lessee (the owner of espn.com in the example) the monetary amount bid. The lessee periodically pays the marketplace the monetary amount owed, with the marketplace taking a transaction fee and transferring the balance to the lessor (the owner of tennistoday.com in the example).

The present invention allows advertisers to select domains that relate to their businesses, increasing the chances of converting the redirected users to customers. The present invention also allows for more continuity by having advertisers specify a daily (or other period) budget for redirects, which is fulfilled on an ongoing basis.

IN THE DRAWINGS

DETAILED DESCRIPTION OF THE INVENTION

Figure 1A:
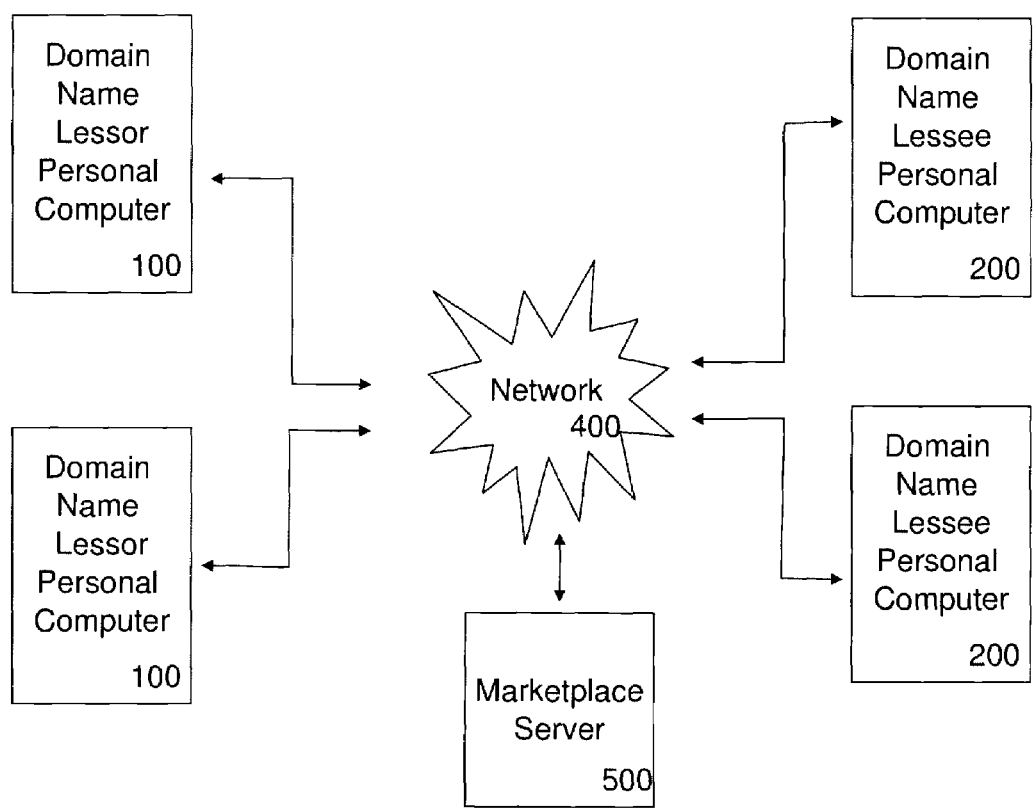
FIG. 1a illustrates the Internet domain monetization marketplace, with the lessor, lessee, and marketplace interacting over a network.

FIG. 1a illustrates a domain name lessor 100 using a personal computer to access the domain marketplace 500 over a network 400 such as the Internet. The domain name lessor 100 registers and lists one to many domain names which that individual or business owns and is interested in leasing to others. A potential domain name lessee 200 using a personal computer connects to the marketplace 500 over the network 400. The domain name lessee 200 then browses the marketplace for open auctions for domain names.

The marketplace 500 can present the information to the domain name lessor 100 and domain name lessee 200 using web pages which require web server software on the marketplace server 500 such as WebSphere from IBM. The domain name lessor 100 and domain name lessee 200 can then view the information using browser software such as Internet Explorer 6.0 from Microsoft.

Figure 1B:
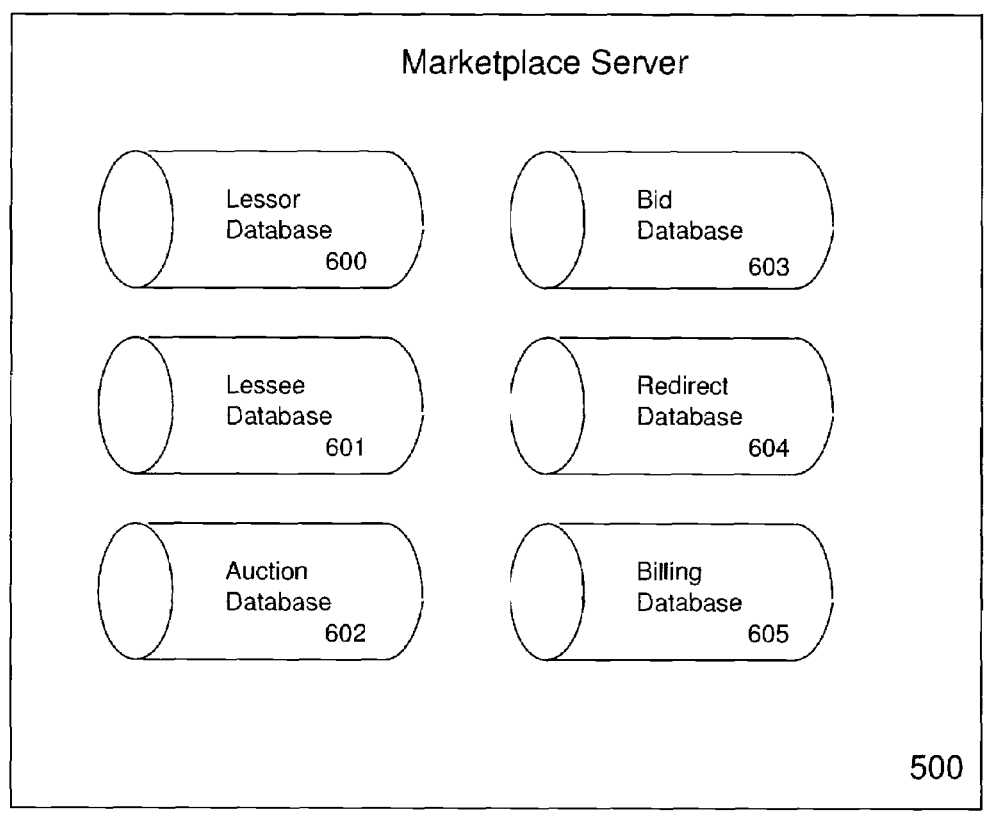
FIG. 1b shows various databases used by the marketplace.

FIG. 1b shows that the marketplace server 500 requires management of a great deal of information, which for purposes of illustration is shown stored in a number of databases. Those skilled in the art will recognize that a variety of options are available for storing and managing this information. In FIG. 1b, a lessor database 600 holds information about individuals or businesses leasing domain names, such as the name of the individual or business, the domain names being leased, address, e-mail, bank information, etc. The system assigns the lessor 100 a unique system identifier. A lessee database 601 holds similar information about the individuals or businesses interested in leasing domain names, as well as the domain names to which traffic is redirected. The system assigns each lessee 200 a unique system identifier.

An auction database 602 holds information about the domain names being auctioned including for each auction a unique identifier, bid open and close times for every auction period of time (for example every month), minimum bid amount, and the unique system identifier of the lessor 100 of the domain being auctioned. In addition, once an auction is won by a lessee 200, the unique identifier of that lessee 200 is captured in the auction database 602.

A bid database 603 holds the bids in an auction. Each record in the bid database 603 includes a unique bid identifier, the auction identifier associated with the bid, the lessor identifier of the bidder, and a timestamp to capture the time the bid was made. A redirect database 604 is used to redirect web traffic from the lessor domain name to the domain name of the lessee that won the auction.

Figure 2A:
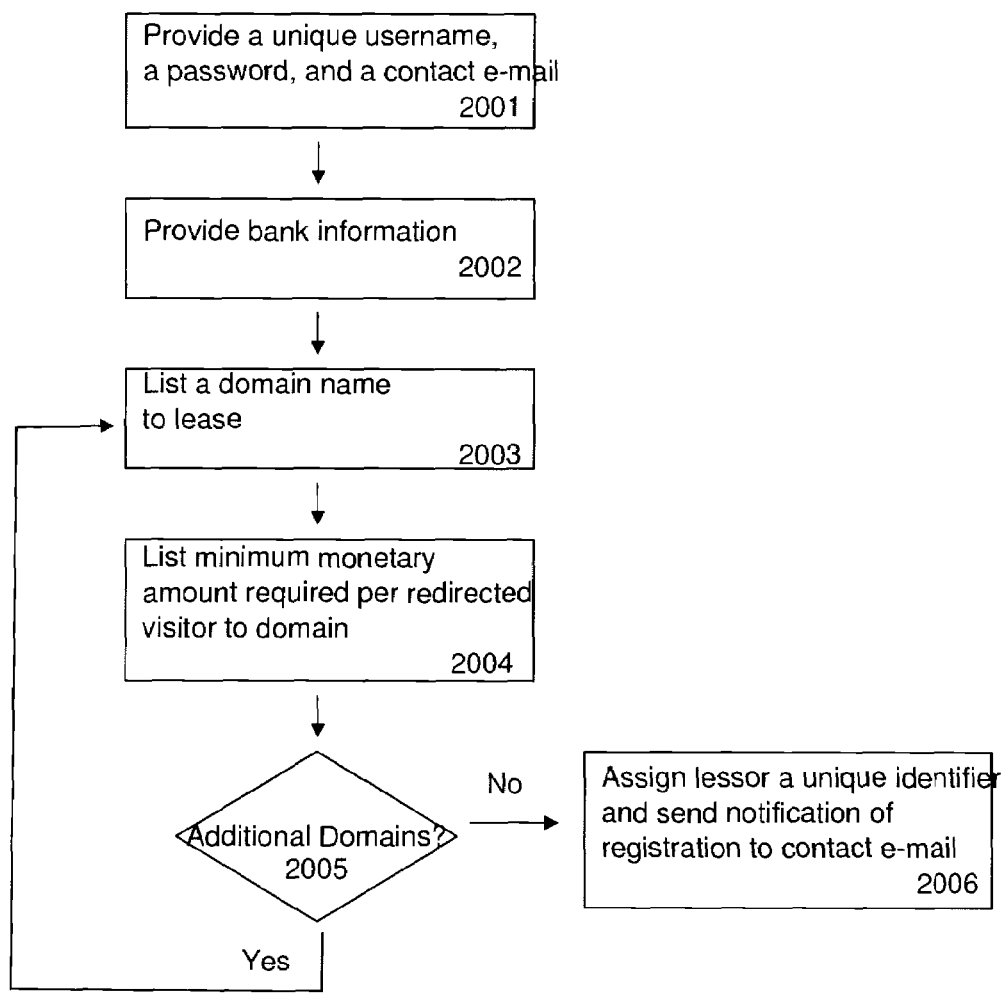
FIG. 2a illustrates registration of a domain name lessor.

FIG. 2a shows an example of the process that a lessor 100 follows when registering with the marketplace server 500. The lessor starts by providing a unique username, password, and contact e-mail 2001. Next, the lessor provides bank information 2002 including account number, bank routing number, and bank name. The bank information is used by the marketplace 500 to pay the lessor for leased domain names. Next, the lessor provides one or more domain names 2003. For each domain the lessor 100 can optionally provide a minimum monetary amount required to lease the domain 2004. Next, the marketplace 500 assigns the lessor a unique identifier and sends the lessor an e-mail confirming the registration 2006. Finally, all of the information relating to the lessor is stored in the lessor database 600. The marketplace can require proof of or verify the lessor's right to lease the domain. In an alternate embodiment the marketplace 500 sets a minimum monetary amount required to lease domains instead of the lessor 100 specifying this amount.

Figure 2B:
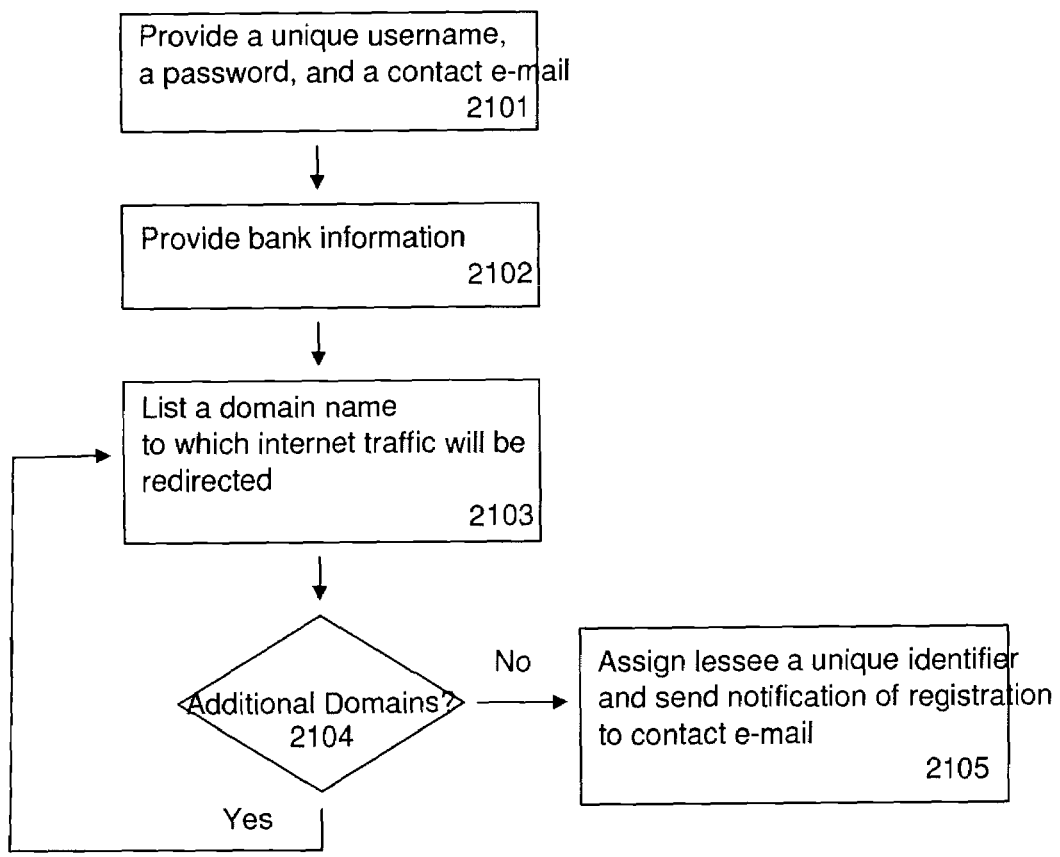
FIG. 2b illustrates registration of a domain name lessee.

FIG. 2b provides an example of the process by which a lessee 200 registers with the marketplace 500. The lessee provides a unique username, password, and contact e-mail 2101. Next, the lessee provides bank information 2102 including account number, bank routing number, and bank name. The bank information is used to pull funds owed to the marketplace 500 and the lessor 100 on the agreed basis. Next, the lessee provides one or more domain names 2103 to which it would like to redirect Web traffic. As described below, when bidding on a domain name the lessor indicates to which of the domain names provided during registration internet traffic should be redirected. Next, the marketplace 500 assigns the lessee a unique identifier and sends the lessee an e-mail confirming the registration 2105. Finally, all of the information relating to the lessee 200 is stored in the lessee database 601.

Figure 2C:
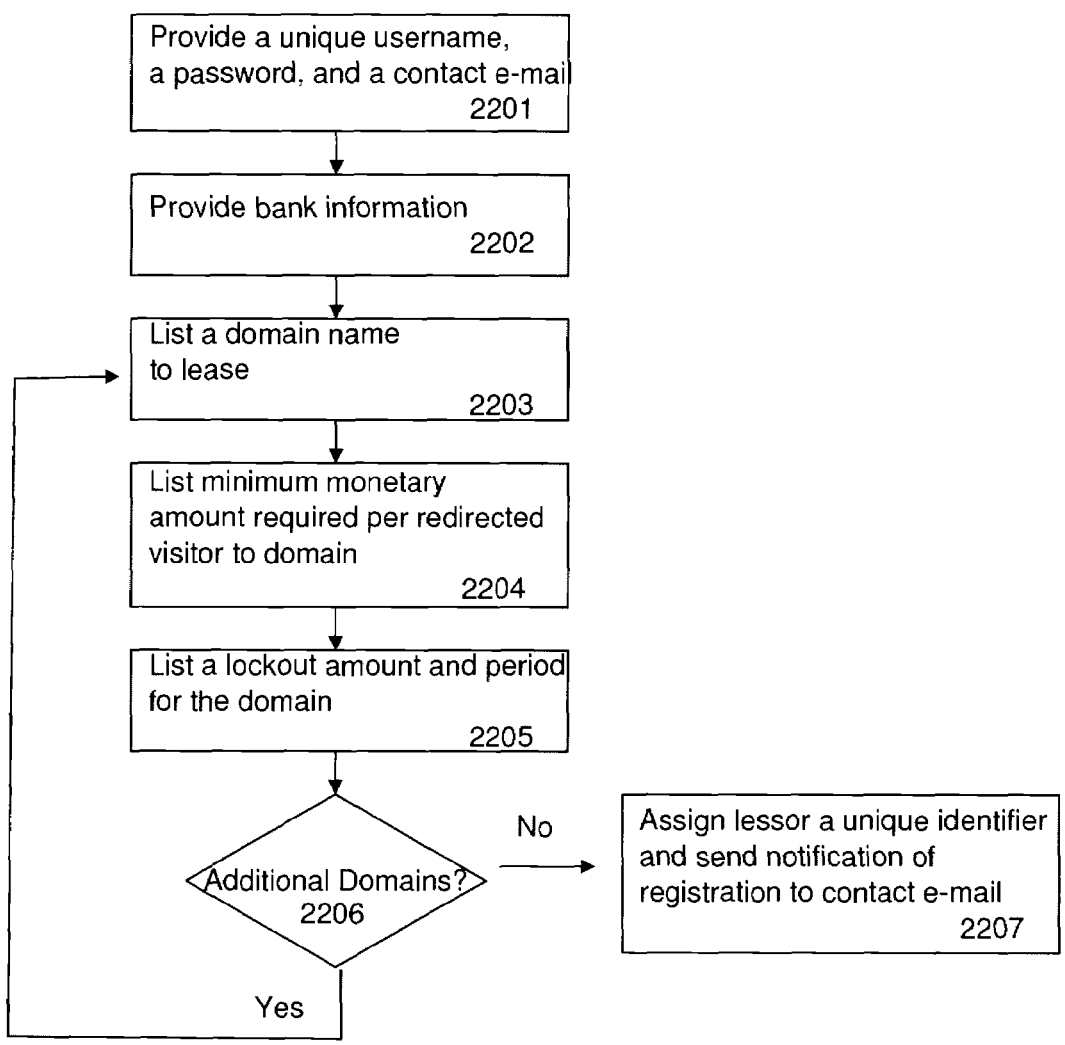
FIG. 2c illustrates registration of a domain name lessor with the ability to lockup domains.

FIG. 2c shows an alternate embodiment of the invention. Step 2205 allows the lessor to set a lockout amount and lockout period for a domain, allowing a lessee to receive traffic from the domain exclusively for a pre-specified period. Other steps of the lessor 100 registration are identical to the steps described in FIG. 2a. The first lessee 200 to bid above the lockout amount will then have all traffic redirected from that domain to the winning bidder's website until the lockout period ends. While the lockout amounts and periods can be set by the lessor during the lessor registration, the lockout values can also be set using a lessor account management feature provided by the marketplace 500. In another embodiment of the invention the marketplace 500 sets the lockout values for lessor domains. The marketplace 500 can set the lockout at any time except when a lockout is in effect for a lessor's domain.

Figure 2D:
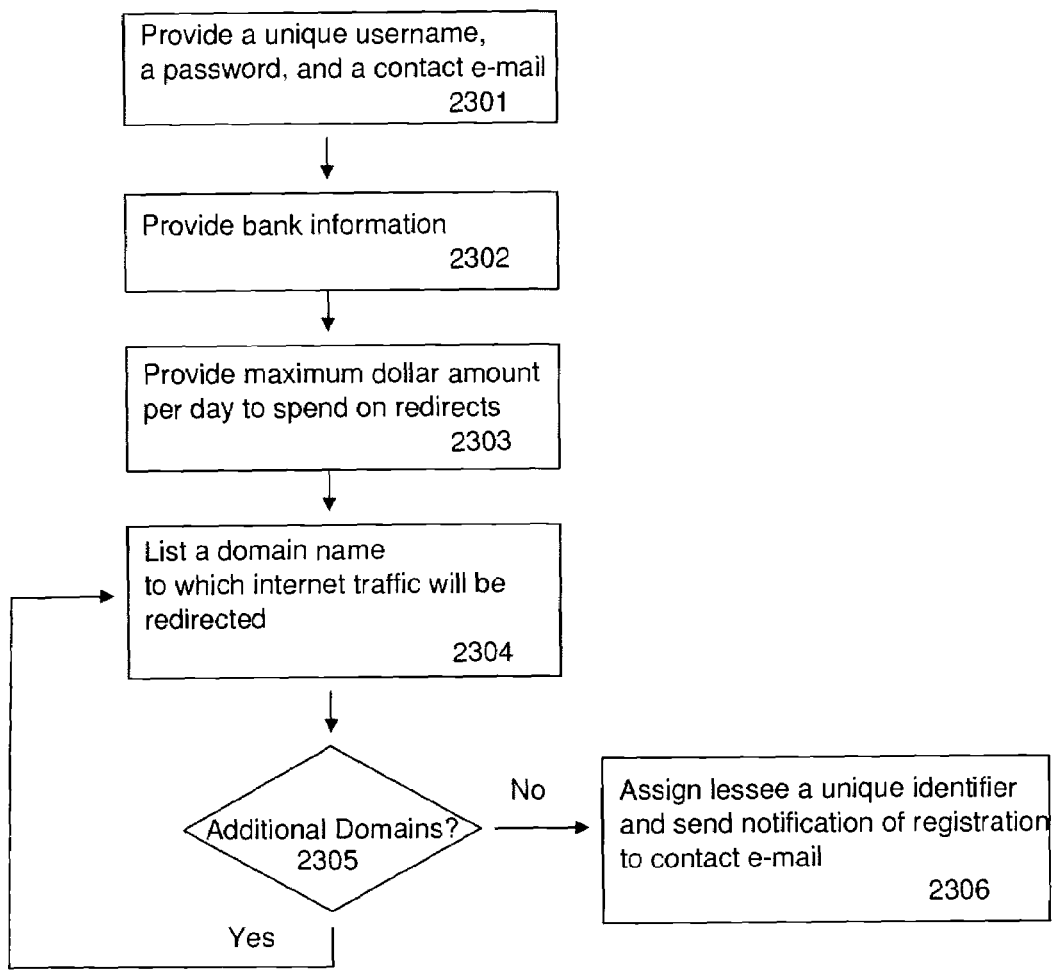
FIG. 2d illustrates registration of a domain name lessee with a cap on spending over a specified period.

FIG. 2d shows another embodiment of the invention. In step 2303, a lessee provides a maximum dollar amount per day, or any other time period, for spending on redirected web surfers. Other steps of the registration are identical to the steps described in FIG. 2b. As an example, a lessee 200 such as espn.com could specify a maximum of $1000 per day, which could translate to 10,000 web surfers redirected to the espn.com website at an average cost of $0.10 per web surfer, all redirected from websites owned by lessors using the marketplace services. The maximum budget amount can be modified after the original registration using an account management function. Such a function could, for example, be accessed over the internet on a website provided by the marketplace 500 or by contacting the marketplace 500 by phone.

With this type of a cap on the amount spent per day set by a lessee, the marketplace 500 could redirect all traffic to the highest bidder and when the cap is reached start redirecting traffic to the second highest bidder, up to that bidder's cap, and then onto the third highest bidder and so on. This mechanism can be used with any bidding embodiments, with lessees able to bid on specific times of day, month, year, geographical locations, etc., and lessors able to optimize lessees to maximize revenue by considering repeat business, segmentation by time and geography, etc.

Figure 3:
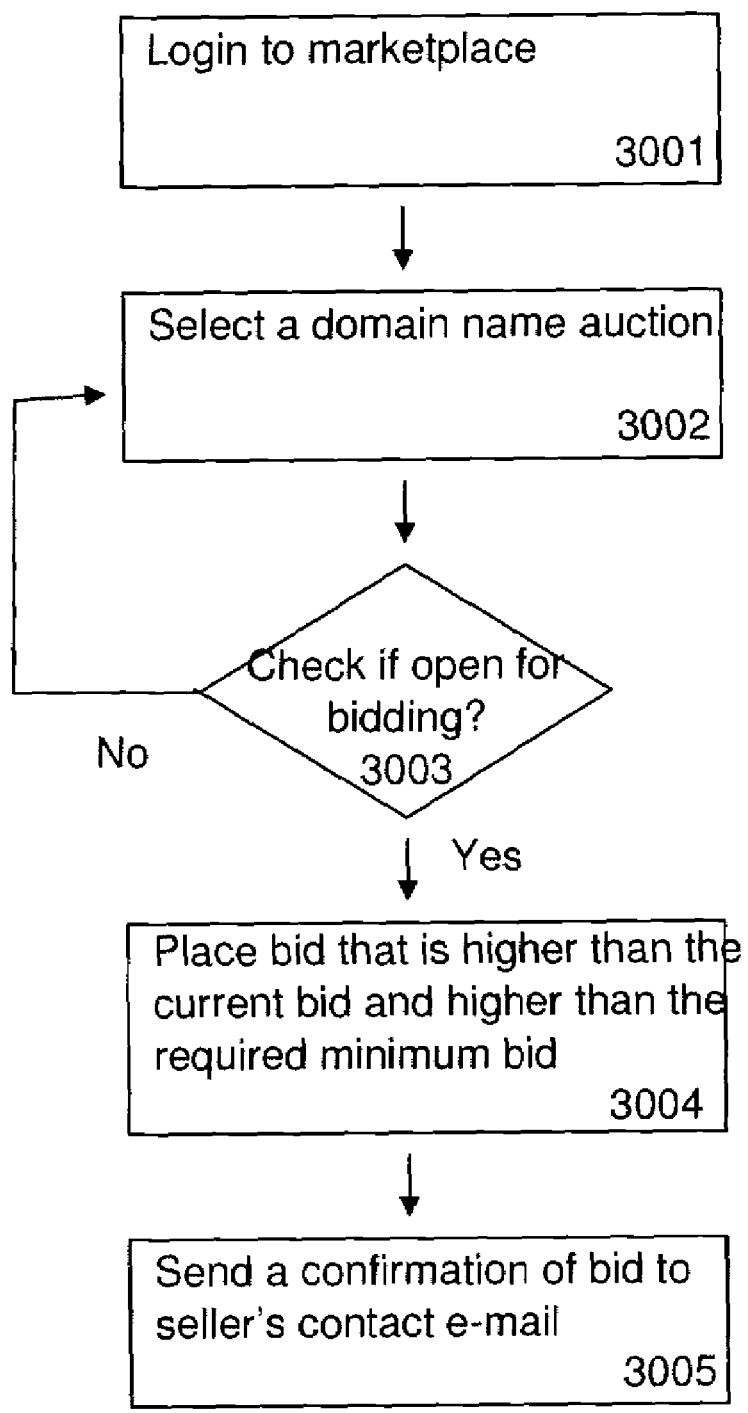
FIG. 3 illustrates bidding by a lessee for a domain.

As seen in FIG. 3, the process of bidding for a domain name requires the lessee 200 to login 3001 to the marketplace 500 using its unique username and password. Next, the lessee must select a domain name auction 3002 from a list provided by the marketplace 500. Then the lessee 200 must check whether the auction is open for bidding 3003. If not, the lessee must select another auction; otherwise, the lessee can place a bid on the auction 3004. The bid includes a monetary amount that the lessee 200 is willing to pay per web visitor that is redirected from the leased domain name to a domain name owned by the lessee 200. The bid amount must be greater than any other bid placed on the auction. In addition, if a minimum bid amount was indicated by the lessor 100 then the bid must be greater than that amount. The bid must also contain the domain name to which the lessee 200 wants to redirect traffic. Finally, the lessee 200 receives a confirmation through e-mail of the bid.

Figure 4:
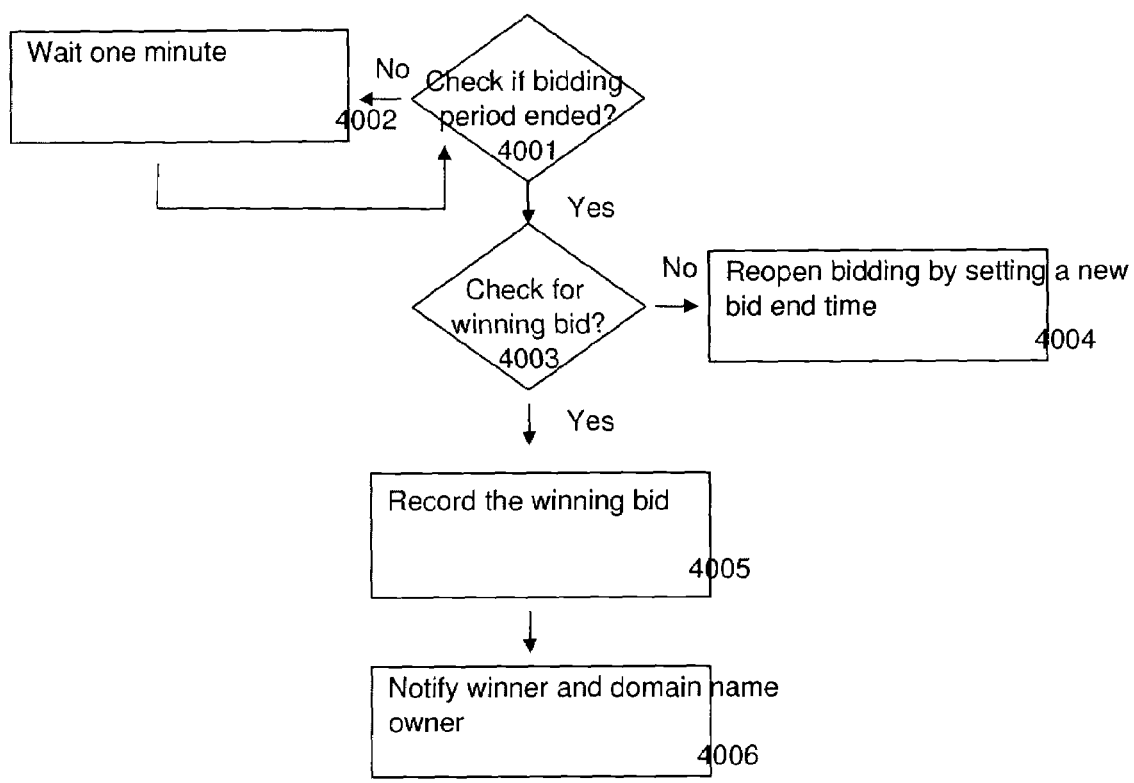
FIG. 4 illustrates determination of winning bids.

FIG. 4 illustrates the process which the marketplace 500 uses to settle the auctions. The process starts with the marketplace 500 checking for an auction whose bidding period has ended 4001 that have bids but no selected winning bid 4003. The marketplace 500 checks the auction database 602 and bid database 603 every minute (or other set time) for this information 4002. For every auction found that meets the above criteria, the marketplace 500 selects the highest bid amount and records in the auction database 602 the bid as the winning bid. If a minimum bid amount is available for the auction then the highest bid must be above the minimum amount for it to be recorded as the winning bid. In addition, a record is added to the redirect database 604 indicating the leased domain, the domain to which internet traffic is redirected, a redirect expiration date, and the monetary amount associated with the bid 4005. The domain to which traffic is redirected can be obtained from the bid record. Then the winner and the domain name owner 4006 are notified.

Figure 5:
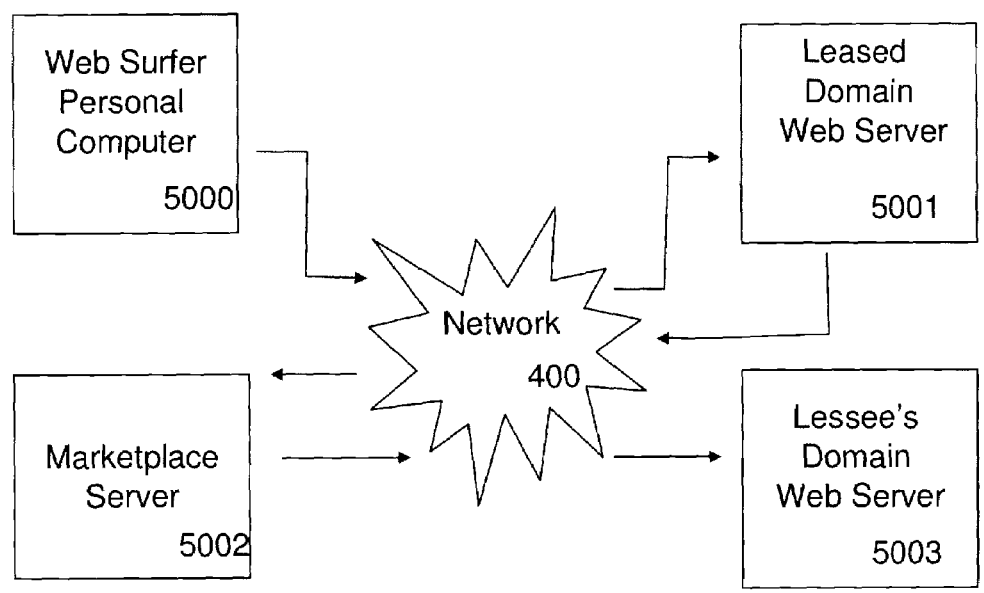
FIG. 5 illustrates redirection of Internet traffic from a lessor website to a lessee website.

FIG. 5 illustrates the process used to redirect traffic from the website for the leased domain name to the website of the lessee. The process begins when a web surfer 5000 using a browser such as Internet Explorer 6.0 from Microsoft visits the website for the leased domain name 5001. The web surfer accesses the website for the leased domain name over a network 400 such as the Internet. The web server hosting the leased website then redirects the web surfer to the marketplace server 5002. This can be accomplished by having the lessor 100 place an html metatag in the default page of the leased website that redirects traffic to the marketplace website after the default page is loaded. Next the marketplace 500 confirms that the redirected web surfer 500 came from a domain name listed in the lessor database 600. This can be accomplished by having software check the header of the Internet Protocol packets that arrive at the marketplace server 500. Next, if the marketplace 500 successfully confirms the origin of the web surfer, the marketplace 500 checks the redirect database 604 for the domain name to which the web surfer is redirected. The marketplace 500 redirects the web surfer to the lessee's website 5003 found in the redirect database 604. The marketplace 500 then retrieves from the redirect database 604 the monetary amount to charge for the redirect, and adds a record in the billing database 605 indicating that the lessee owes that monetary amount to the lessor.

A further embodiment of the invention requires lessors 100 to map their domains to domain name servers belonging to the marketplace before lessors can use the marketplace service. In order to point the domains to the domain servers of the marketplace 500, lessors must go to the domain registrar whom they used to buy the domains and change the DNS settings for the domains they are leasing. The DNS settings for the leased domains should be updated to point to the primary and secondary domain servers of the marketplace 500. The domain registrar might also require that the internet protocol address of the primary and secondary marketplace 500 domain servers be specified.

For example, the lessor 100 of tennistoday.com would go to its domain registrar (for example register.com) and change the DNS setting for tennistoday.com to point to the marketplace domain servers, for example server1.marketplace.com and server2.marketplace.com. The domain registrar might also require that the internet protocol address of the primary and secondary domain servers be specified, for example 223.32.24.234 and 223.32.24.235.

Figure 5B:
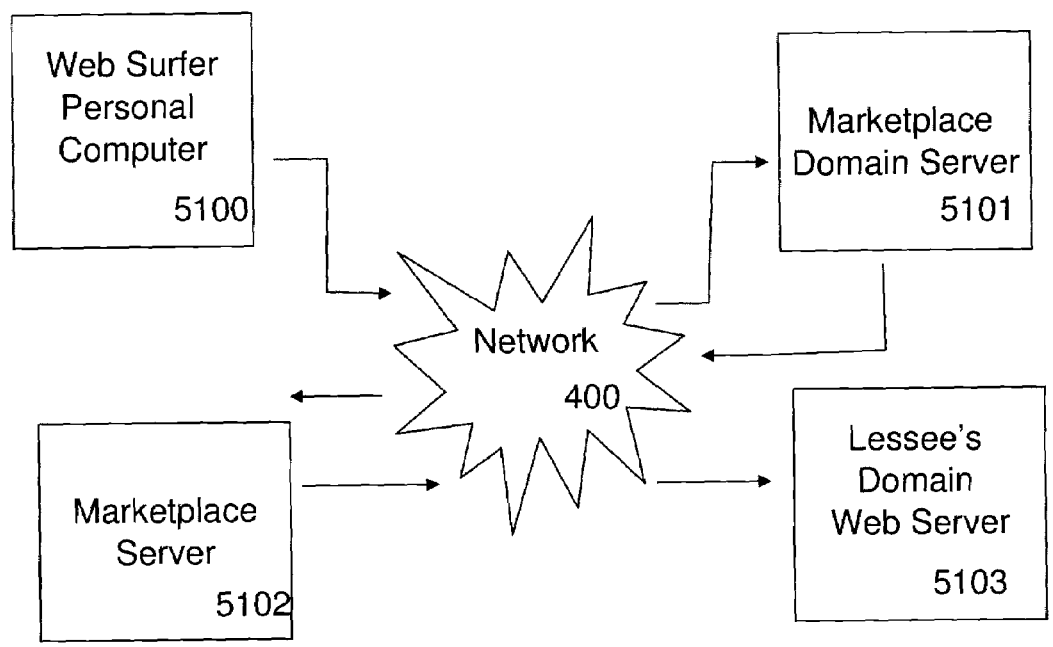
FIG. 5b illustrates redirection of Internet traffic from a lessor website to a lessee website by mapping the lessor domain to the marketplace domain name servers.

Once the lessor domain is pointing to the domain servers of the marketplace 500, the process of redirecting web surfers is depicted in FIG. 5b. Initially a web surfer working on a personal computer 5100 types into his web browser a domain name of a lessor 100. Next, the marketplace domain server 5101 is reached through the DNS architecture and the lessor 100 domain is resolved to the internet protocol address of the marketplace server 5102. Then the marketplace server 5102 finds the appropriate lessee web server 6103 in the Redirect Database 604 to which to redirect the web surfer.

An alternate embodiment requires lessors 100 to use domain forwarding instead of re-pointing their domains. As with re-pointing domains, domain forwarding can be set up through the domain registrar (e.g. register.com). The forwarding address would be a web address owned by the marketplace 500 and the forward would include the domain name that set to forward. For example tennistoday.com would use the following forwarding address: http://www.marketplace-.com/tennistoday.com.

Figure 6:
FIG. 6 illustrates settlement of funds.

FIG. 6 illustrates the process used to settle funds between the parties. The process starts with the marketplace 500 retrieving a billing record from the billing database 605. The marketplace then retrieves from the lessor database 600 the bank account number and routing number of the lessee associated with the billing record. Next the marketplace, using a technology such as ACH, retrieves the funds indicated on the billing record from the bank of the lessee into the marketplace's bank account. Once the funds have been deposited into the marketplace's bank account the marketplace using ACH transfers, a subset of the funds is transferred to the lessor associated with the billing record. The bank information of the lessor is retrieved from the lessor database 600. The funds settling processes is performed periodically, for example once a month.

Instead of using ACH, the marketplace can also use credit cards, debit cards, or solutions such as PayPal to transfer funds. Therefore, in FIG. 2a instead of providing bank information in step 2002, the lessor 100 can provide a PayPal account where funds owed will be placed by the marketplace on a regular basis. Similarly in FIG. 2a step 2102, instead of providing bank information the lessee can provide credit or debit card information. The marketplace then on a regular basis charges the lessee's credit or debit card the amount owned. Alternatively, all funds owed by a specific lessee cam be retrieved using one ACH transaction or one credit or debit transaction that is performed periodically.

In an alternative embodiment of the invention, the auctions for domain names have no time limit. The auctions are always open for bids. At any time a lessee can outbid the highest bid for a domain name. The process for bidding remains as described in FIG. 3. However, the process for finding the winning bid described in FIG. 4 changes slightly. Periodically, for example every few minutes, all auctions are reviewed and if a new highest bid is placed for a given auction the marketplace checks whether the bid is above the minimum bid amount, if one exists, and if so sets the new bid as the winning bid in the auction database 602 and resets the redirect database 604 to the lessee's domain name indicated by the winning bid. Alternatively, whenever a new bid is placed the marketplace checks in the auction database 602 whether the new bid is higher than existing bids for the given auction. In addition, the new bid is checked to be above the minimum bid amount, if one exists. If both conditions are met, the marketplace 500 sets the new bid as the winning bid in the auction database 602 and resets the redirect database 604 to the lessee's domain name indicated by the winning bid.

It may be desirable to some lessees and/or lessors to group domain names into categories. Domain names that relate to a certain topic are grouped by the system administrator, either manually or automatically. The group names and the domain names they contain are stored in a group database on the marketplace server. The auction database 602 stores the category name being auctioned and the associated domain names for each auction. The process described in FIG. 3 remains the same, except that lessees bid on groups instead of individual domains. The process described in FIG. 4 also remains the same, except that in step 4005 the marketplace 500 records in the redirect database 604 a record per domain name in the category that was bid on. In addition, in step 4006 all of the domain name owners in the category bid on are notified of the winning bid.

In another embodiment of the invention, multiple bidders win the bidding for a category. During the bidding described in FIG. 3, bidders submit bids 3004 that are higher than the specified minimum. Bids do not need to be higher than other bids made for the same auction. All other steps of FIG. 3 remain the same. Also, in FIG. 4 step 4003 which determines the winning bids the marketplace 500 finds the highest set of bids. For example, the marketplace 500 finds the top three bids placed in the auction. In step 4005, the marketplace 500 records all of the winning bids in the auction database 602 and the redirect database 604. Finally, in FIG. 5, before the marketplace redirects the visitor web surfer to a lessee 200, the marketplace 500 finds all of the lessees that won the auction for the category to which the leased domain name belongs. The marketplace 500 then picks in order one of the lessee and redirect the user to that lessee's website. The next time the marketplace 500 redirects to a different lessee among the winning lessees for that category. In order to keep track of the last lessee to which the marketplace redirected a web surfer, the marketplace can mark the record of that lessee in the redirect database 604. The marketplace 500 can start with the highest bid among the lessees and next redirect to the domain of the next highest bid. When the marketplace 500 reaches the lowest bid among the winning bids for the category the marketplace 500 can again redirect to the domain owned by the highest bidder for the category.

Alternatively, when the marketplace 500 picks among the winning bids, the marketplace could pick the lessee with the higher bid more often than the lessees with lower bids. This can be accomplished by having the marketplace administrator assign percentages to each winning bid, with larger percentages being assigned to higher bidding lessees. Alternatively, an algorithm can be used to assign these percentages. For example, the algorithm could provide the highest bidder with 50% of the redirected traffic, the next higher bidder 30%, and the third highest bidder 20%. Also, the algorithm could redirect all traffic to the highest bidder until some maximum amount of traffic (or expense) is reached for the day (or other period). That maximum amount could be provided by the lessee when bidding. Once the maximum is reached the next highest bidder would get the balance of the redirected traffic until the day ends (or some other period).

The marketplace allows lessees to bid in bulk on domains. For example, a lessee could specify a bid for all domains in a certain category or for multiple categories. Alternatively, the lessee could manually select a set of domains to bid on and provide one bid value for all of the selected domains. The marketplace then informs the lessee of the domains for which its bid is the highest, or domains for which its bid is one of a set of winning bids.

Lessees can also specify for a set of bulk domains a maximum dollar amount per day, or any other time period, for spending on redirected web surfers. This amount would be in place of the maximum dollar amount provided during registration described in FIG. 2d.

Figure 7:
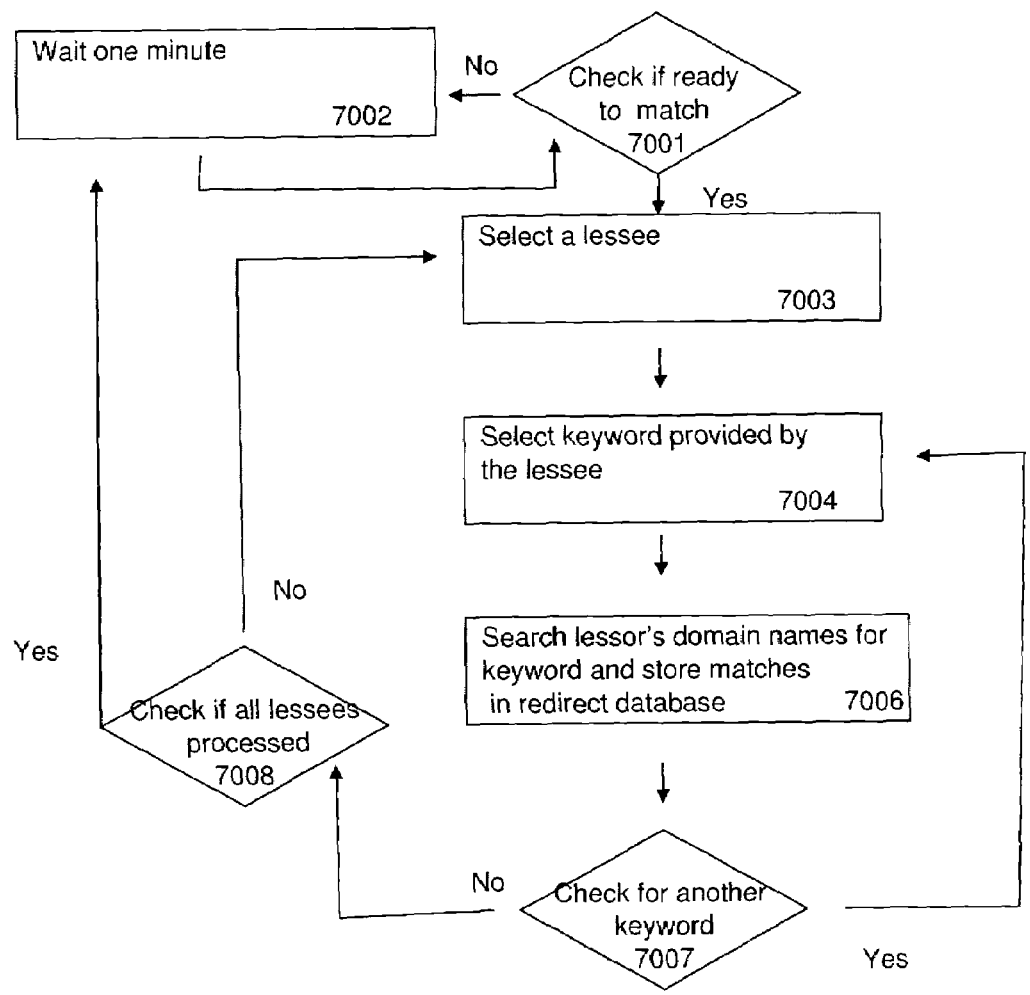
FIG. 7 shows matching based on keywords provided by lessees.

Lessees 200 may also provide keywords that relate to the domain name to which they want to redirect web surfers. The marketplace 500 then matches the keywords with lessors' domain names that contain those keywords. Lessees also provide the amount they are willing to pay per web surfer redirected to their domain. Thus, as part of FIG. 2b, in step 2103 in addition to providing a domain name, lessees provide a set of keywords that relate to each domain name and a monetary amount per domain name that the lessee would pay per redirected web surfer. Instead of the bidding described in FIG. 3 and FIG. 4, a matching algorithm described in FIG. 7 is used. In step 7001 the marketplace 500 checks whether a certain amount of time past since the last time the matching algorithm ran, for example have five minutes past. The last run time can be recorded in the database. If the necessary amount of time has not passed then in step 7002 the marketplace waits a minute and then returns to step 7001. If enough time has passed since the last run, then the marketplace 500 selects one lessee 7003 and selects one keyword provided by the lessee 7004. The marketplace 500 then searches all of the registered lessor domain names for the keyword. All domain names that contain the keyword are identified and for each match a record is created in the redirect database 604. Next, the marketplace 500 checks if another keyword was provided by the lessee 7007, and if so it repeats steps 7004 to 7005 for that keyword. Once all keywords for a lessee 200 have been processed the marketplace 500 checks for another lessee 200 that has not been processed. The database can be used to keep track of lessees that have been processed, or matched with domain names. If the marketplace 500 finds a lessee 200 that was not processed, it repeats the steps starting at 7003, or else it returns to the waiting state 7002. Next, the marketplace 500 after running the matching algorithm can use a round robin when multiple lessees 200 match a lessor's 100 domain name, as described above. Alternatively, the marketplace 500 can assign percentages to higher bids as described in above.

Instead of only matching keywords provided by the lessee, the marketplace 500 alternatively can look up synonyms and related words based on the provided keywords. Synonyms can be looked up using a dictionary. Related words can be looked up from a database, such as those used in speech processing applications. An example of related words is "baseball" and "bat". Once related words and synonyms are identified, they can also be used in the matching step 7006.

Lessors can also provide keywords in addition to the lessees providing keywords. Lessors provide keywords related to the domain name they register with the marketplace. This is done in FIG. 2a as part of step 2004. In FIG. 7, step 7006 matching can be done between the key words and related words of the lessors and key words and related words of the lessee, thereby optimizing redirection of web surfers.

Furthermore, in another embodiment of the invention lessers lessees provide a set of keywords and the monetary amount they will pay per visitor redirected to their domain. Lessors register with the marketplace and provide a minimum monetary amount per visitor redirected from their domain. A software program then matches lessees with lessors by finding domain names registered with the marketplace that contain one or more of the keywords supplied by individual lessors; for those domains the program checks that the specified minimum monetary amount is less than the monetary amount supplied by the individual lessees. In cases when multiple lessors are matched with a lessee a round robin is used to redirect web surfers to the domains associated with the lessors. Lessees with higher bids can receive a higher percentage of redirected web surfers.

Lessees can use an interface provided by the marketplace, such as a web interface, to find a list of lessor domains that relate to a keyword or a set of keywords. The process of identifying the domains is identical to the matching process described above, where keywords provided by the lessee are searched within the lessor domains. In addition to the provided keywords, synonyms of the keywords can be searched in the lessor domains. Misspellings and commonly associated words can also be searched in the lessor domains. Once a list of lessor domains is provided, the lessee can choose to bid on all or a subset of the domains.

A computer program or an electronic agent can be used to assist with the bidding. A lessee would use such an electronic agent to avoid having to manually monitor the bidding on a domain. The electronic agent can be given by the lessee specific domains to bid on and a maximum bid amount per domain. The electronic agent then bids on behalf of the lessee, bidding above other bidders up to the maximum amount specified per domain by the lessee. In another embodiment, the electronic agents do not bid but instead notify lessees when one of their bids has been out-bid. It is then the lessees' decision whether to increase their bids. Notifications can be made using communication media such as e-mail or phone.

In a further embodiment, the web surfer is only redirected to a lessee's 200 domain name if the web surfer is identified as being from a pre-specified geographic location. In this embodiment, the lessee when bidding in FIG. 3 step 3004 provides geographic restrictions that it would like to have associated with the bid. The marketplace then uses the geographic restriction in FIG. 5 step 5002. By looking at the IP address of the web surfer, the marketplace can determine the general geographic location of the web surfer. Only when the web surfer is within the required region will the marketplace 500 redirect that user to the lessee 200.

The lessee 200 can also specify a certain time frame during which web surfers should be redirected to their site. The implementation of this embodiment is identical to the one described in the previous paragraph except that the restriction is time based as opposed to location based.

The marketplace can also track and capture the action of a web surfer after he is redirected from a lessor 100 domain to the website of a lessee 200. One way to accomplish this tracking is by placing an image link that loads from the marketplace 500 server on pages belonging to the lessee 200. Thus, whenever those images are loaded the marketplace 500 can capture the action in the redirect database 604.

It is also possible to place sponsored links on the lessor's domain until a lessee successfully bids for the domain, such as Google's AdSense. With sponsored links, a set of links are placed on a web page. Such a web page appears when the lessee's domain is typed into a web browser. Each click on a sponsored link makes the lessor some money. Once a lessee is matched with a lessor, the redirect model can be used instead of sponsored links.

Winning bids may be determined by multiple criteria, not just bid amount. For example, customer conversion rate and maximum daily budget can also be used to determine winning bids. For example, in step 4003 of FIG. 4, the marketplace 500 can calculate the weighted average of the bid amount, daily budget amount and customer conversion rate (calculated using tracking information stored in the redirect database). This weighted average can then be used to determine winning bids.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for leasing of domain names, comprising:
    (a) receiving domain names from lessors at an electronic;
    (b) presenting the domain names for lease of redirected traffic utilizing the electronic marketplace;
    (c) receiving a bid from each of a plurality of bidding lessees at the electronic marketplace, the electronic marketplace including information on lessors, lessees, bid terms, and payment transfers from lessors to lessees, each bid being for a bid amount and at least one keyword;
    (d) associating each bid with a respective domain name by associating the keyword for the bid with at least one of the domain names;
    (e) comparing bid amounts associated with the domain name by a respective keyword to determine at least one winning bid; and
    (f) automatically redirecting traffic associated with the domain name to an internet site associated with the winning bid of a winning lessee.

2. The method of claim 1, further comprising:
    (a) determining the total revenue received from a bidding lessee; and
    (b) selecting a winning lessee from the bidding lessees at least in part based on the total revenue received from the bidding lessee.

3. The method of claim 1, wherein the winning lessee is the exclusive recipient of redirected traffic during a specified time period.

4. The method of claim 1, wherein a plurality of winning lessees receive redirected traffic during specified time periods on a prioritized basis established by weighting at least one variable selected from the group consisting of the monetary amount of each winning lessee's bid, keywords provided by each winning lessee, the total revenue received from each winning lessee, time of day specified by each winning lessee's bid, and the geographic location of each winning lessee.

5. The method of claim 1, further comprising:
(a) receiving from each bidding lessee a cap to the amount spent in a specified time period for redirected traffic; and
(b) redirecting traffic away from the internet site of a winning lessee when the amount spent reaches the cap.

6. The method of claim 1, wherein a bidding lessee bids for redirected traffic from a plurality of domain names.

7. The method of claim 1, wherein a bidding lessee may submit new bids at any time in an attempt to outbid a prior winning lessee for redirected traffic, further comprising:
periodically automatically repeating (c) to (f), wherein the winning bid changes from one lessee to a new lessee, the new lessee thereby becoming the new winning lessee.

8. The method of claim 1, further comprising:
utilizing the electronic marketplace to automatically place a sponsored link on a lessor's domain at times when no successful bids from lessees have been received for redirected traffic from the domain.

9. The method of claim 1, further comprising:
(a) collecting payment from the winning lessee; and
(b) transferring payment to the lessor of the domain name.

10. A computer-readable storage medium having stored thereon a set of instructions that are executable by at least one processor of a computer system to carry out a method of leasing domain names, comprising:
(a) receiving domain names from lessors at an electronic marketplace;
(b) presenting the domain names for lease of redirected traffic utilizing the electronic marketplace;
(c) receiving a bid from each of a plurality of bidding lessees at the electronic marketplace, each bid being for a bid amount and at least one keyword;
(d) associating each bid with a respective domain name by associating the keyword for the bid with at least one of the domain names;
(e) comparing bid amounts associated with the domain name by a respective keyword to determine at least one winning bid; and
(f) automatically redirecting traffic associated with the domain name to an internet site associated with the winning bid of a winning lessee.

11. A computer system for leasing of domain names comprising:
at least one processor;
a storage device connected to the processor; and
a set of instructions on the storage device, the set of instructions being readable by the processor and including:
a domain name receiving module to receive domain names from lessors;
at least one data store to store the domain names;
a presentation module to preset the domain names for lease of redirected traffic;
a bid receiving module to receive bids from each of a plurality of bidding lessees that includes information on lessors, bid terms, and payment transfers from lessors, each bid being for a bid amount and at least one keyword, the information being stored in the data store;
an association module to associate each bid with a respective domain name by associating the keyword for the bid with at least one of the domain names;
a comparing module to compare bid amounts associated with the domain name by a respective keyword to determine at least one winning bid; and
a redirection module to automatically redirect traffic associated with the domain name to an internet site associated with the winning bid of a winning lessee.

* * * * *